April 2, 1946.  N. HOERTZ  2,397,486
SEAL
Filed Nov. 29, 1943
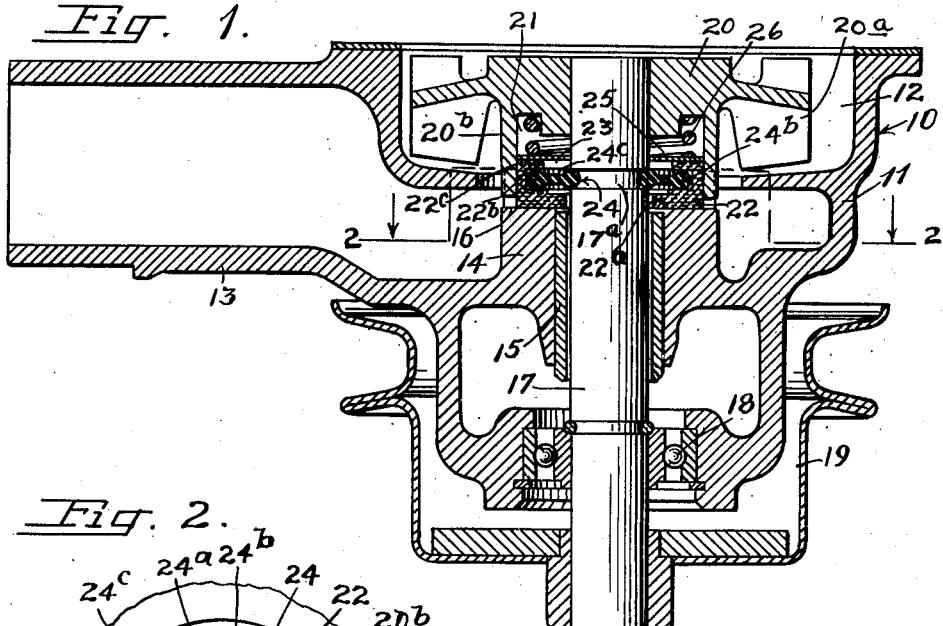
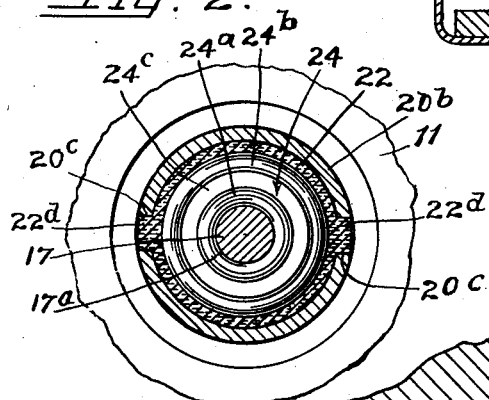
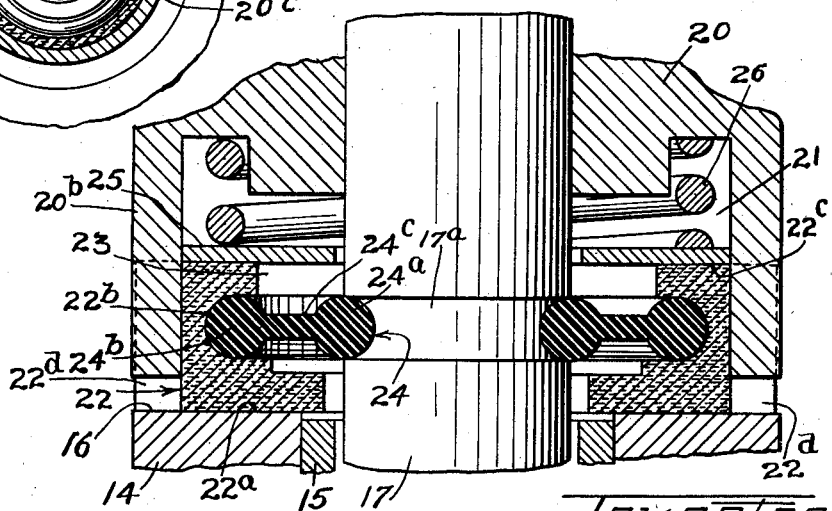
Inventor
Norman Hoertz
by Charles W. Hills Attys Patented Apr. 2, 1946

2,397,486

UNITED STATES PATENT OFFICE 2,397,486

SEAL

Norman Hoertz, Cleveland, Ohio, assignor to Thompson Products, Inc., a corporation of Ohio Application November 29, 1943, Serial No. 512,165

2 Claims. (Cl. 286—11)

This invention relates to seal constructions of the type having relatively movable seal members in sliding face-to-face sealing engagement.

More particularly the invention relates to shaft seals wherein a diaphragm member tightly embraces the shaft and is seated in a rotating sealing washer or ring.

The invention will hereinafter be described as embodied in a water pump for an internal combustion engine, but it should be understood that the seals of this invention are not limited to such usage since they are generally applicable for sealing relatively movable parts such as relative rotating parts.

In accordance with this invention, a pump casing is provided with a hub having an annular sealing end face and receiving a pump shaft therethrough. The shaft is grooved adjacent the annular end sealing face of the hub and a pump impeller is secured on the shaft in spaced relation from this groove. A sealing ring or washer, preferably composed of compressed graphitic carbon, loosely embraces the shaft and has an end face for riding on the annular end sealing face of the hub. A spring acts on the sealing ring or washer to urge the same against the hub end face and a deformable diaphragm ring preferably composed of rubber or rubber-like material has a beaded outer peripheral portion seated in an internal groove in the sealing washer or ring and a beaded portion around the hole therethrough seated in the groove of the shaft. The inner and outer beads of the diaphragm ring are connected through an integral readily deformable web portion. The inner bead sealingly engages the shaft while the outer bead sealingly engages the sealing washer or ring. The shaft can wobble or tilt without moving the sealing washer because the diaphragm ring will deform to absorb such wobbling or tilting movements without transmitting them to the sealing washer. As a result, the sealing washer is always maintained in full sealing contact with the end face of the hub.

It is, then, an object of this invention to provide a seal construction of the type having relatively movable seal parts in sliding face-to-face engagement with a readily deformable diaphragm ring sealingly engaging one of the seal parts and one of the parts to be sealed.

A still further object of this invention is to provide a shaft seal of the type having relatively rotating seal members in face-to-face engagement with a simple beaded diaphragm ring sealingly engaging the shaft and the movable seal part and adapted to accommodate wobbling or tilting movements of the shaft without transmitting such movements to the rotating seal part.

A still further object of this invention is to provide a shaft seal for the pumps and the like wherein a simple one-piece diaphragm ring sealingly connects one of the seal parts with the shaft and deforms to accommodate relative tilting between the seal part and the shaft.

A still further object of this invention is to provide an inexpensive pump shaft seal wherein a rubber-like diaphragm member is stretched over the shaft to sealingly engage the same and is pressed into a rotating seal part for sealingly connecting said part with the shaft.

Other and further objects of the invention will be apparent to those skilled in the art from the following detailed description of the annexed sheet of drawings which, by way of preferred example only, illustrates one embodiment of the invention.

On the drawing:

Figure 1 is a central vertical cross-sectional view, with parts in elevation, of a water pump for an internal combustion engine equipped with a shaft seal according to this invention.

Figure 2 is a fragmentary horizontal cross-sectional view taken substantially along the line II—II of Figure 1.

Figure 3 is an enlarged fragmentary view similar to Figure 1 illustrating the seal construction.

As shown on the drawing:

In Figure 1 the reference numeral 10 designates generally a water pump for an internal combustion engine. The pump 10 has a casing 11 defining a pumping chamber 12. The casing 11 has an inlet 13 communicating with the pumping chamber 12 and the pumping chamber is open-topped to communicate directly with the interior of an internal combustion engine for circulating water through the engine.

The casing 11 also has a central hub portion 14 receiving a liner or bushing 15 therethrough. The hub portion 14 has a smooth annular end face 16 communicating with the pumping chamber 12.

A pump shaft 17 extends from outside of the casing 11 through the liner or bushing 15 into the pumping chamber 12. The casing 11 carries a ball bearing 18 rotatably supporting the shaft 17. The bearing 18 has an inner race ring press-fitted onto the shaft to hold the shaft against axial movement relative to the casing. A pulley 19 is fixedly secured on the end of the shaft projecting beyond the casing 11 for rotating the shaft from a fan belt (not shown) as is conventional in internal combustion engine water pump systems.

The shaft 17 is grooved adjacent the end face 16 of the hub 14 as at 17a.

An impeller 20 is secured on the portion of the shaft projecting into the pumping chamber 12. This impeller 20 has vanes 20a around the periphery thereof for pumping water from the inlet 13 through the open top of the pumping chamber 12. An annular skirt 20b depends from the impeller 20 into spaced relation from the end face 16 of the hub and provides a cylindrical chamber 21 around the shaft 17. The skirt has slots 20c, preferably diametrically opposed as shown in Figure 2, extending axially inward from the lower end thereof.

A sealing washer or ring 22 loosely embraces the shaft 17 and has an end face 22a riding on the end face 16 of the hub 14. The sealing washer or ring 22 has an internal groove 22b therein which can have a semi-circular cross section as shown in Figure 3 or a flat bottom and flat side walls as shown in Figure 1. The ring 22 has an end face 22c opposite the sealing end face 22a thereof which is preferably provided with a large opening such as 23 giving free access to the groove 22b. Integral lugs or keys 22d project radially from the ring 22 into the slots 20c of the skirt. These lugs have a sliding fit in the slots but serve to key the ring and impeller together for co-rotation.

In accordance with this invention a rubber diaphragm ring 24 sealingly connects the shaft 17 and the sealing washer 22. This diaphragm ring 24 has a bead 24a around the opening therethrough adapted to be stretched over the shaft 17 and snapped into the groove 17a thereof for sealingly seating in the groove. The diaphragm ring 24 also has a deformable beaded peripheral portion 24b for insertion through the opening 23 of the sealing washer 22 to snap into the groove 22b of the sealing washer and sealingly engage the groove wall. As indicated above, and as shown in Figure 3, the groove wall 22b is preferably of segmental circular cross section to conform with the contour of the bead 24b but, as shown in Figure 1, the groove 22b can be flat bottomed and the bead 24b can sealingly engage such a flat bottomed groove at several points such as the side walls and bottom of the groove.

A readily deformable web 24c joins the inner and outer beads of the diaphragm ring 24.

A metal washer 25 loosely embraces the shaft 17 and is slidable in the skirt 20b of the impeller 20 to be bottomed on the face 22c of the sealing washer.

A coil spring 26 is disposed in the skirt 20b of the impeller 20 and is compressed between the impeller and the metal washer 25 for urging the sealing washer 22 into sealing engagement with the end face 16 of the hub 14.

The sealing washer 22 and metal washer 25 are slidingly guided by the skirt 20b of the impeller and can be moved by the spring 26 through deflection of the web portion 24c of the diaphragm ring 24, since the sealing washer 22 and metal washer 25 have holes therethrough of larger diameter than the shaft 17. The shaft can tilt or wobble without contacting these members and the tilting or wobbling movement of the shaft will be absorbed by the deformable diaphragm ring 24 without being transmitted to the sealing washer 22. As a result, the sealing washer 22 is always maintained by the spring 26 in full sliding sealing engagement with the end face of the hub 14. The diaphragm sealingly connects the washer 22 with the shaft to prevent leakage from the pumping chamber through the sealing washer and of course the sealing engagement between the face 22a of the sealing washer and the face 16 of the hub 14 prevents leakage from the pumping chamber around the sealing washer. As a result, the pumping chamber is efficiently sealed. The sealing washer 22 is driven from the skirt 20b of the impeller 20 through the lugs 22d on the washer which are seated in the slots 20c of the skirt.

The seals of this invention are readily assembled and replaced. The diaphragm ring is easily stretched over the shaft to snap in a groove in the shaft and is easily deformed into the groove in the sealing washer.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A seal construction comprising an internally grooved sealing washer, a shaft projecting through said washer having a groove intermediate the end faces of the washer, and a deformable diaphragm having inner and outer beads connected through an integral web portion sealingly engaging the groove in the sealing washer and the groove in the shaft.

2. A seal construction comprising an interally grooved sealing washer, and a one-piece rubber-like deformable diaphragm ring having an outer peripheral bead portion sealingly seated in the groove of the washer together with an inner peripheral bead portion adapted to sealingly engage a member extending through the sealing washer.

NORMAN HOERTZ.